United States Patent [19]
Venables et al.

[11] Patent Number: 6,037,380
[45] Date of Patent: Mar. 14, 2000

[54] ULTRA-FINE MICROCRYSTALLINE CELLULOSE COMPOSITIONS AND PROCESS

[75] Inventors: Aaron C. Venables, Yardley; Gregory S. Buliga, Langhorne; Sheila M. Dell, New Hope, all of Pa.; John A. Colliopoulos, Princeton Junction, N.J.

[73] Assignee: FMC Corporation, Philadelphia, Pa.

[21] Appl. No.: 09/088,772

[22] Filed: Jun. 2, 1998

Related U.S. Application Data

[60] Provisional application No. 60/043,479, Apr. 11, 1997, and provisional application No. 60/049,554, Jun. 13, 1997.

[51] Int. Cl.[7] .............................. A61K 9/16; A61K 47/38; B01J 13/00; C08B 15/08
[52] U.S. Cl. .................. 514/781; 106/217.3; 241/16; 252/363.5; 424/488; 424/489; 426/72; 426/74; 426/567; 426/570; 426/658; 514/629; 514/819; 514/937; 516/75; 516/77
[58] Field of Search ..................... 516/75, 77; 241/16; 514/937, 781; 106/217.3; 426/658, 567, 570, 72, 74; 536/56

[56] References Cited

U.S. PATENT DOCUMENTS

| | | |
|---|---|---|
| 2,978,446 | 4/1961 | Battista et al. |
| 3,539,365 | 11/1970 | Durand et al. ........................ 106/197 |
| 3,573,058 | 3/1971 | Tiemstra ................................ 426/658 |
| 4,311,717 | 1/1982 | McGinley ............................. 516/77 X |
| 4,427,681 | 1/1984 | Munshi ............................... 514/781 X |
| 4,517,179 | 5/1985 | Raghunathan ...................... 514/781 X |
| 4,744,987 | 5/1988 | Mehra et al. ....................... 514/781 X |
| 5,011,701 | 4/1991 | Baer et al. ............................... 426/573 |
| 5,079,001 | 1/1992 | Affolter ............................... 514/937 X |
| 5,123,962 | 6/1992 | Komuro et al. ....................... 106/163 |
| 5,180,522 | 1/1993 | Kawashima et al. ..................... 516/77 |
| 5,192,569 | 3/1993 | McGinley et al. ................. 426/658 X |
| 5,366,742 | 11/1994 | Tuason, Jr. et al. ............... 426/658 X |
| 5,415,804 | 5/1995 | Minami et al. ...................... 252/363.5 |
| 5,462,761 | 10/1995 | McGinley et al. ................. 426/658 X |
| 5,533,678 | 7/1996 | Strauch et al. ........................... 241/16 |

FOREIGN PATENT DOCUMENTS

| | | |
|---|---|---|
| 0 193 984 A2 | 9/1986 | European Pat. Off. |
| 0415193 A2 | 3/1991 | European Pat. Off. |
| WO 94/12043 | 6/1994 | WIPO. |
| WO 98/24821 | 6/1998 | WIPO. |

OTHER PUBLICATIONS

WPI Abstract of SU 1 747 460 A (Nechaeva, et al.).
Copy of PCT International Search Report.

*Primary Examiner*—Richard D. Lovering
*Attorney, Agent, or Firm*—FMC Corporation

[57] ABSTRACT

Ultra-fine microcrystalline cellulose compositions are disclosed which produce highly stable suspensions and/or dispersions in which substantially all of the microcrystalline cellulose has a particle size not greater than about 0.7 $\mu$m. The compositions include an attriting aid which has a dual functionality, assisting in reducing the size of the cellulose microcrystals and adding a desired property or ingredient to the dispersions or other product in which the compositions are utilized.

21 Claims, No Drawings

ULTRA-FINE MICROCRYSTALLINE CELLULOSE COMPOSITIONS AND PROCESS

REFERENCE TO RELATED APPLICATIONS

This application claims priority based on provisional application No. 60/043,479 filed Apr. 11, 1997 and provisional application No. 60/049,554 filed Jun. 13, 1997.

The present invention relates to ultra-fine microcrystalline cellulose, compositions thereof, to a process for their manufacture, and to certain products containing the same. More particularly the invention relates to particulate microcrystalline cellulose compositions which may be dispersed to form suspensions or dried and the resulting particulate solid dispersed in liquid media to produce a suspension. In the suspensions, substantially all microcrystalline cellulose particles are of sub-micron size and remain in a colloidal state even when centrifuged. This invention also relates to suspensions made from the ultra-fine microcrystalline cellulose of this invention.

BACKGROUND OF THE INVENTION

Microcrystalline cellulose is a purified, partially depolymerized cellulose that is produced by treating a source of cellulose, preferably alpha cellulose in the form of pulp from fibrous plant materials, with a mineral acid, preferably hydrochloric acid. The acid selectively attacks the less ordered regions of the cellulose polymer chain thereby exposing and freeing the crystalline sites which form crystallite aggregates which constitute the microcrystalline cellulose. These are then separated from the reaction mixture, and washed to remove degraded by-products. The resulting wet mass, generally containing 40 to 60 percent moisture, is referred to in the art by several names, including hydrolyzed cellulose, hydrolyzed cellulose wetcake, level-off DP cellulose, microcrystalline cellulose wetcake or simply wetcake.

When the wetcake is dried and freed of water the resulting product, microcrystalline cellulose, is a white, odorless, tasteless, relatively free-flowing powder, insoluble in water, organic solvents, dilute alkalis and acids. For a fuller description of microcrystalline cellulose and its manufacture see U.S. Pat. No. 2,978,446. The patent describes its use as a pharmaceutical excipient, particularly as a binder, disintegrant, flow aid, and/or filler for preparation of compressed pharmaceutical tablets. Microcrystalline cellulose is manufactured by FMC Corporation and sold under the designation Avicel® PH cellulose in several grades having average particle sizes ranging from about 20 $\mu$m to about 100 $\mu$m.

Microcrystalline cellulose and/or hydrolyzed cellulose wetcake has been modified for other uses, notably for use as a gelling agent for food products, a thickener for food products, a fat substitute and/or non-caloric filler for various food products, as a suspension stabilizer and/or texturizer for food products, and as an emulsion stabilizer and suspending agent in pharmaceutical and cosmetic lotions and creams. Modification for such uses is carried out by subjecting microcrystalline cellulose or wetcake to intense attrition forces as a result of which the crystallites are substantially subdivided to produce finely divided particles. However, as particle size is diminished, the individual particles tend to agglomerate or hornify upon drying, probably due to the hydrogen or other bonding forces between the smaller sized particles. To prevent agglomeration or hornification, a protective colloid, such as sodium carboxymethylcellulose (CMC), which wholly or partially neutralizes the bonding forces which cause agglomeration or hornification, may be added during attrition or following attrition but before drying. This additive also facilitates re-dispersion of the material following drying. The resulting material is frequently referred to as attrited microcrystalline cellulose or colloidal microcrystalline cellulose. For a fuller description of colloidal microcrystalline cellulose, its manufacture and uses, see U.S. Pat. No. 3,359,365, in which it is stated that at least 1% and preferably at least 30% of the microcrystalline cellulose has been reduced to a particle size not exceeding about 1.0 micron.

Colloidal microcrystalline cellulose is a white odorless, hygroscopic powder. On being dispersed in water, it forms white, opaque thixotropic gels. It is manufactured and sold by FMC Corporation (FMC) in various grades under the designations, among others, Avicel® RC and Avicel® CL, which comprise co-processed microcrystalline cellulose and carboxymethylcellulose sodium. In FMC Product Bulletin RC-16, the grades designated as RC-501, RC-581, RC-591, and CL-611 are described as producing dispersions in which approximately 60% of the particles in the dispersion are less than 0.2 micron when properly dispersed.

With increased interest in the use of finely divided cellulosic materials in food and pharmaceutical suspensions, researchers in the field have focused a significant amount of attention on improving the smoothness and mouth feel of suspensions made from such cellulosic materials, and have determined, for example, that cellulosic particles which have a particle size above about 3 $\mu$m are perceived by the tongue as particulate or grainy matter. Komuro, European Patent Publication No. 0 415 193 A2, teaches that to avoid that sensation it is necessary to provide a material in which 50% cumulative volume of the cellulosic particles have a particle size in the range of 0.3 $\mu$m to 6.0 $\mu$m when at least 25% of the cumulative volume in the suspension has a particle size of no greater than 3 $\mu$m. The patent also teaches a grinding method and apparatus which employs a high speed rotary grinder for wet grinding the cellulose material using ceramic or metallic beads as grinding medium in order to achieve these objectives. It and a related patent to Komuro et al., U.S. Pat. No. 5,123,962, but in particular the latter, have an extensive discussion on the unsuccessful efforts made in the art to further reduce the particle size of microcrystalline cellulose.

Similarly, U.S. Pat. No. 5,415,804, teaches that a smooth mouth feel depends on the colloid fraction as well as particle size distribution and average particle size, the colloid fraction being that fraction of the dispersed particles which cannot be precipitated upon centrifugation of the dispersion. Depending on the particle size distribution (which is somewhat broader than that in the Komuro patent, above, being as high as 10 $\mu$m), the colloidal fraction must be in the range of 50% to 65% cumulative volume. In this patent, however, certain water soluble gums and/or hydrophilic materials are employed to offset the wider range of size distribution.

SUMMARY OF THE INVENTION

In accordance with the present invention, a method has now been found for reducing the particle size of microcrystalline cellulose and forming microcrystalline cellulose compositions which have an extremely high (in some cases as high as 100%) percentage of microcrystalline cellulose having a particle size of consistently less than 1 micron, which, when dispersed in liquid media, will not precipitate out of the dispersion and cannot be physically removed or precipitated by centrifugation below about 15,000 rpm. For purposes of this invention, that concept is hereinafter referred as "colloidally stable."

In the process of the invention, hydrolyzed cellulose wetcake is wet-ground with an attriting aid under high shear high solids mixing conditions and optionally with a protective colloid to form the microcrystalline cellulose compositions of this invention.

The attriting aid which facilitates the wet grinding of the microcrystalline cellulose may remain in the product and will preferably contribute a desired property or component to the finished product in which the microcrystalline cellulose is used. As an example of this dual functionality, calcium carbonate or other suitable calcium salts may be utilized as an attriting aid for microcrystalline cellulose compositions used to prepare calcium fortified milk products. It is also contemplated that the attriting aid will itself, or at least a major portion of it, be suspended in the colloidal microcrystalline cellulose dispersions in which the compositions of this invention are utilized.

The process may also employ a protective colloid which prevents hornification of the microcrystalline cellulose and also facilitates redispersion of dried microcrystalline cellulose compositions. However, in certain microcrystalline cellulose compositions used as a filler or bulking aid, it may be desirable to omit the protective colloid in order to promote formation of a densified, less porous reduced absorptive form of microcrystalline cellulose.

The composition of this invention may be the moist attrited microcrystalline solid recovered from the grinding process; or it may be the dried residue thereof prepared by removing moisture from the moist solid, the latter being preferred for storage, shipment and subsequent use in preparing microcrystalline cellulose dispersions.

The dispersions in which the present microcrystalline cellulose compositions are utilized have excellent suspending and stabilizing properties and require less microcrystalline cellulose (on a weight basis) to achieve stabilization and/or suspension properties equal to or greater than those achievable only with higher levels of existing microcrystalline cellulose products. Dispersions made from the compositions of this invention contain ultra-fine sub-micron sized particles of microcrystalline cellulose virtually all of which is colloidally stable, as defined above, and therefore can provide improved suspension/stabilization.

DETAILED DESCRIPTION OF THE INVENTION

The present invention utilizes as a starting material the hydrolyzed cellulose wetcake described above, which is the undried mass produced when a source of cellulose, preferably alpha cellulose in the form of pulp from fibrous plant materials, is treated with a mineral acid and then washed to remove the acid and by-products, producing a wetcake generally containing about 40 to about 60 percent moisture. In accordance with the present invention an attriting aid is blended with the wetcake. Optionally a protective colloid is added as well, particularly if it is contemplated that the composition will be dried, stored or shipped in dried form and dispersed to obtain colloidally stable dispersions. These starting ingredients may then be blended in the customary manner. In preparation of the wet blend, the moisture content may be adjusted as desired to produce the consistency desired for attrition of the blend and adjusted as needed during attrition to maintain the desired consistency. In a preferred embodiment the moisture present in the wetcake is generally sufficient. The use of excess water is to be avoided as it will tend to reduce the particle-to-particle abrasion forces which are necessary to reduce the microcrystalline cellulose particles to a consistent sub-micron size.

The wet blend is then attrited preferably as a high-solids wet blend under high shear high solids mixing conditions, in which the attriting aid grinds or facilitates grinding of the microcrystalline cellulose into ultra-fine sub-micron sized particles which on dispersion are colloidally stable. In a preferred embodiment the colloidal stability is further facilitated by inclusion of a protective colloid.

The attriting aid, as indicated above, is preferably selected as a multifunctional component of the blend. That is, it serves to grind the microcrystalline cellulose and also serves the additional function of contributing a desired component or property to the product in which the microcrystalline cellulose composition of this invention is utilized. Thus, in selecting an attriting aid it is preferred that the selection be made with due consideration to both of these objectives.

With respect to its function in grinding the microcrystalline cellulose to an ultra-fine particle size, the attriting aid must be relatively water insoluble; that is, sufficiently insoluble that it will not appreciably dissolve when blended with the hydrolyzed cellulose wetcake. More particularly the attriting aids useful in the present invention may be ionic materials having an aqueous $K_{sp}$ equal to or less than $1 \times 10^{-7}$ or powdered or granular materials having a solubility in water equal to or less than 40% at 100° C. It should be a relatively fine material so that it comes in intimate grinding contact with the wetcake particles during attrition, but is not necessarily of colloidal size. Thus, for example, its particle size may be in the range of from about 0.1 microns to about 100 microns advantageously in the range of about 0.1 to about 20 $\mu$m and preferably is less than about 10 $\mu$m. Agents which have been demonstrated to be suitable ionic materials include limestone (calcium carbonate), dicalcium phosphate, tricalcium phosphate, zinc carbonate, zinc hydroxide, magnesium phosphate, barium carbonate, barium sulfate, ferrous carbonate, aluminum hydroxide, magnesium hydroxide, and magnesium aluminum hydroxide. Other materials useful as attriting aids include non-ionic materials such as silica, various clays, silicates, silicon dioxide, talc, titanium dioxide, and certain plastic resins, as well as partially soluble organic materials, for example lactose and the like. In fact many materials are believed suitable for this purpose, and it is contemplated that these attriting aids may be utilized alone or in combination to achieve the desired properties.

In addition to their function in grinding cellulose, the attriting aids of this invention preferably remain as a component of the dispersions formed from the microcrystalline cellulose compositions of this invention, and contribute a desired ingredient, component or property to such end products. As indicated above calcium carbonate is beneficially used to fortify calcium values in milk or dairy products and to coat paper and perform other functions in paper making processes; magnesium and/or aluminum hydroxides may be useful additives pharmaceutical preparations such as antacids; and titanium dioxide containing compositions find utility in paints and pigments, in coffee creamers and numerous other products. The attriting agents of this invention may advantageously be abrasive, relatively insoluble components utilized in pharmaceutical, personal hygiene and cosmetic applications and products, such as lotions ointments, gels, and pastes, including for example toothpastes and other dental care products. For toothpastes, preferable attriting agents include calcium carbonate, dicalcium phosphate and silica which are known abrasives in toothpaste.

For most applications it is preferred that the blend contain a protective colloid. When present, these protective colloids may perform one or more of several functions. They act as a barrier between and/or around the microcrystalline cellulose particles, presumably by attaching to or replacing the hydrogen bonding forces between them, and thus form a barrier between such particles to prevent them from hornifying. Secondly they act as dispersion aids to facilitate dispersion and rehydration of the microcrystalline cellulose particles when dried solid compositions of microcrystalline cellulose are redispersed. In addition, they may help in suspending and/or altering the rheological properties of the suspension. It is expected that numerous agents will serve similar functions, for example, cellulose derivatives such as carboxymethylcellulose, hydroxypropylcellulose, hydroxypropylmethyl-cellulose and hydroxyethylcellulose. Various gums such as guar, locust bean, arabic, tragacanth and karaya, as well as seaweed extracts such as carrageenan and alginates, and starches such as maltodextrin, hydrolyzed cereal solids, and pectin may also be useful. A preferred agent for this purpose is sodium carboxymethylcellulose (CMC).

For other applications, for example when it is desired to use the compositions as fillers or bulking agents, it may be desirable to have a product which is densified, relatively non-porous which has low water and oil absorbtivities. For these applications the microcrystalline cellulose and attriting agent may be used without inclusion of a protective colloid. Upon drying the product will then agglomerate into a denser less porous material than could have been obtained with previous products having larger, less uniform microcrystalline cellulose particles. These fillers or bulking agents will be less absorptive (water or oil) and can be useful in low moisture applications, for example low moisture foods such as sandwich cookies, chocolate, peanut butter, and the like.

Reduction of microcrystalline cellulose to colloidal particle size is preferably carried out by high solids, high shear wet grinding of the blend of microcrystalline cellulose, attriting aid, and preferably a protective colloid. The use of a standard extruder, preferably with multiple screws, is a preferred means for reducing microcrystalline cellulose particle size. Other standard equipment may also be used for high shear wet grinding operations, such as planetary mixers, for example Hobart mixers, ball mills, attrition mills, and roll mills, particularly those having 3 or more rolls. It is important that equipment used provide high shearing action and provide intense rubbing, abrasive action between the microcrystalline cellulose and attriting aid, for example by forcing the mixture through passages of limited cross section such as those found in perforated plates of extruders and various other mixing equipment, or other passages of limited clearance such as between rolls of roller mills. The extrusion process is preferred for its ease of operation in high solids, high throughput processing and for its efficacy in yielding very fine particles of microcrystalline cellulose.

In the process of this invention, the first step comprises blending together unattrited microcrystalline cellulose, an attriting agent and optionally a protective colloid. The solids content represented by the microcrystalline cellulose and attriting agent is suitably in the range of about 30% to about 80% by weight of the blend, preferably about 40% to about 60%. The weight ratio of microcrystalline cellulose to attriting agent is suitably in the range of about 85:15 to about 30:70, advantageously in the range of about 70:30 to about 40:60. When a protective colloid is used it is suitably utilized in an amount in the range of 5% to 30% by weight, preferably 5% to 15%, of the microcrystalline cellulose; that is, the weight ratio of microcrystalline cellulose to protective colloid is in the range of about 95:5 to about 70:30. Blending is continued until a uniform wet blend is obtained.

The wet blend is then subjected to high shear wet grinding for a time and under shear forces sufficient to reduce the microcrystalline cellulose to a particle size in which about 80% to 100%, advantageously about 90% to 100%, of the microcrystalline cellulose has a particle size not greater than 1 $\mu$m and is colloidally stable when dispersed in aqueous media. Any larger particles will nevertheless have a particle size under about 3–4 $\mu$m, so that the resulting blend is virtually free of particles which would be perceived by the mouth and tongue as having a gritty or grainy mouth feel. Preferably, however, nearly 100% of the microcrystalline cellulose has a particle size of less than 1 micron, and at least 90% to 95% has a particle size of less than 0.75 $\mu$m. As shown in the examples the microcrystalline cellulose particle size distribution appears to be in the range of about 0.1 to about 0.7 $\mu$m in the microcrystalline cellulose dispersions produced in accordance with this invention.

The particle size of the attriting aid is usually not appreciably reduced when an extruded blend contains an attriting aid whose particles are harder than those of the microcrystalline cellulose. For example, extruding a blend comprising calcium carbonate having a mean particle size of several microns, can provide a dispersion having submicron particles of microcrystalline cellulose with calcium carbonate particles of several microns. Thus, it is possible to provide dispersions where the microcrystalline cellulose is submicron and the attriting aid is much larger.

The moist attrited microcrystalline cellulose composition resulting from an extrusion or other suitable process may be recovered and then dispersed as a stabilizer/suspending agent for suspension and dispersions and/or may be further processed, dried, then dispersed for such uses. The further processing step, if utilized, may involve preparing an initial dispersion, homogenizing the resulting dispersion, drying it, for example, by spray drying or other suitable means, all of which are within the skill of the art and illustrated in the examples below.

Depending on the starting ingredients and the ratios in which they are employed, compositions of this invention thus comprise an ultra-fine attrited microcrystalline cellulose composition comprising microcrystalline cellulose particles which have a particle size as described above, optionally an attriting aid as defined above, and optionally a protective colloid, in which the weight ratio of the microcrystalline cellulose to attriting aid is in the range of about 85:15 to about 30:70, advantageously about 70:30 to about 40:60 and, when a protective colloid is used, the weight ratio of microcrystalline cellulose to protective colloid is in the range of about 95:5 to about 70:30.

The ultra fine colloidally stable microcrystalline cellulose of this invention or the product of this invention of the microcrystalline cellulose, attriting agent and optional protective colloid is utilized in dispersions, emulsions, suspensions and the like in an amount of from about 0.05–15 weight percent, advantageously 0.05 to 5 weight percent, preferably from about 0.05–3 weight percent, and is used as a filler or bulking agent, in an amount of about 1–25 weight percent, based on the final product. For food applications, 0.05–15 weight percent may suitably be used.

It will be appreciated by those skilled in the art that the compositions of this invention will have many and diverse applications in the food, pharmaceutical, and personal care products such as cosmetic creams and lotions and dental care products such as toothpaste formulations, as well as for numerous medical and industrial applications, wherever and whenever a more effective suspension stabilizer or smooth creamy filler or dispersion aid is required. Thus, the products are particularly suitable for calcium fortification, texturization and stabilization of milk products, suspending nutritional, vitamin and mineral supplements, for suspensions of water insoluble organic molecules, and for such diverse applications as stabilization of various other food, pharmaceutical, dental, and cosmetic formulations, paints, and numerous industrial applications, such as suspending opacifiers in paper making processes, and coating paper with calcium carbonate. The following examples thus merely illustrate some of the potential uses for the compositions of this invention, and are not intended as limiting the scope of applications for which the invention is useful. Unless otherwise specified all percentages in the examples are by weight.

These examples also illustrate, however, in using the products of this invention in finished products, one must take into consideration many different and diverse formulation factors which influence and/or determine the nature and quality of the product that is to be prepared. The composition of this invention must be used at the appropriate level or concentration for each such product. The specific properties of each product or formulation may be affected by such other factors as the specific attriting agent selected for a particular formulation, other additives to be included in the formulation, et cetera. As examples of such design and formulation considerations, Example 9 illustrates that, while calcium values are highly desirable as calcium supplements for certain foods and pharmaceutical products, the use of a highly soluble calcium salt such as calcium sulfate does not produce a microcrystalline cellulose composition which disperses well in aqueous media, but tends to cause flocculation of the microcrystalline cellulose for reasons which are not fully understood. In like manner, while example 17 illustrates the preparation of an elegant pourable suspension, the inclusion of sucrose in the formulation produces a paste which cannot be resuspended on addition of water. Similarly, example 18 illustrates the ability to prepare stable spoonable pharmaceutical preparation having the consistency and appearance of whipped cream or other whipped food, pharmaceutical or cosmetic products.

EXAMPLE 1

In a Hobart mixing bowl were placed 237.5 grams of ground limestone ($K_{sp}=3.36\times10^{-9}$), 552.3 grams of hydrolyzed cellulose wetcake, and 26.9 grams of medium viscosity carboxymethylcellulose. The ratio of solids comprising this mixture was 47.5 parts of cellulose, 47.5 parts of calcium carbonate, and 5 parts of carboxymethylcellulose. The mixer was operated until the composition was uniform. The composition was then transferred to a twin screw extruder operated at 150 rpm with the outlet gate set 6.35 mm for the first pass and 19.05 mm for the second through fourth passes. Dispersions of this wet product having 1% and 2% solids were prepared in water. The 1% dispersion became a stable gel. When examined using a microscope, the particles of cellulose appeared to be extremely fine and uniform in size. The 2% dispersion set up into a strong gel. The remaining product was dispersed in water at 5% solids and homogenized at 17,236.9 kPa (2500 psi). The viscosity of this dispersion after homogenization was 8700 cps. The dispersion was then spray dried at an inlet temperature of 190–200° C. and an outlet temperature of 100° C. A dispersion of 8 grams of the resulting powder in 392 grams of water was prepared in a Waring blender. Initially, the viscosity as measured by a Brookfield RVT viscometer using spindle #1 at 10 rpm for 1 minute was 615 cps. The dispersion of this powder had the same stability as the dispersions of the wet composition after attrition. Additional dispersions of the spray dried powder were prepared at 1%, 0.75%, and 0.5% solids. There was no sedimentation at 1% and the system gelled. At 0.75% there was only very slight sedimentation. The system formed a weak gel and was rated as being stable. At 0.5% the dispersion sedimentation remained slight and the system was slightly gelled.

EXAMPLE 2

Additional compositions were prepared while varying the ratio of the solid components significantly. The procedure described in Example 1 was followed exactly. In Table 1, the composition that was attrited is shown, including the ratio of solids.

TABLE 1

| | Composition | | | |
|---|---|---|---|---|
| Example | Wet cake[a] (g) | CaCO$_3$ (g) | CMC[b] (g) | Ratio of Solids |
| 2A | 576.9 | 225.0 | 53.8[c] | 45/45/10 |
| 2B | 865.4 | 125.0 | 40.3[d] | 67.5/25/7.5 |
| 2C | 718.0 | 488.0 | 34.4[d] | 35/61/4 |
| 2D | 980.8 | 75.0 | 45.7[d] | 76.5/15/8.5 |

[a]hydrolyzed cellulose wetcake
[b]Carboxymethylcelllose
[c]26.9 grams each of low viscosity and medium viscosity carboxymethylcellulose
[d]Medium viscosity carboxymethylcellulose The product of these examples, when dispersed in water at 1% solids, yielded stable dispersions, with very slight sedimentation occurring for Examples 2A and 2C, the latter due to the high calcium carbonate: microcrystalline cellulose ratio. Examples 2B and 2D were also dispersed at 0.5% solids and formed stable dispersions at this level as well.

This example demonstrates that a wide range of amounts and ratios of components of the composition may be utilized.

EXAMPLE 3

The colloidal content of the attrited compositions of Example 2 was determined by a centrifugation at 8250 rpm for 15 minutes followed by gravimetric analysis of the dried supernatant product. The amount of colloidal material in the product of Example 1 was determined to be 49.4%, but, since calcium carbonate comprises 50% of the composition, the colloidal content of the cellulose plus carboxymethylcellulose is 98.8%. Similar determinations were made for the products of Examples 2A through 2D. These determinations are shown in Table 2.

TABLE 2

| | Percent Colloidal | |
|---|---|---|
| Example | Composition | Cellulose[a] |
| 2A | 52.9 | 96.1 |
| 2B | 74.0 | 98.7 |
| 2C | 39.0 | 100.0 |
| 2D | 80.0 | 94.1 |

[a]Based on total cellulose and carboxymethylcellulose

EXAMPLE 4

In a Hobart mixing bowl were placed 250 grams of ground limestone having a particle size of about 0.8 microns, 576.9 grams of hydrolyzed cellulose wetcake, and 26.9 grams of medium viscosity carboxymethylcellulose. The ratio of solids comprising this mixture was 45 parts of cellulose, 50 parts of calcium carbonate, and 5 parts of carboxymethylcellulose. The mixer was operated for 5 minutes until the composition was uniform. The composition was then transferred to an twin screw extruder operated at 150 rpm with the outlet gate set 25.4 mm for two passes. The product was dispersed in water at 8% solids and homogenized at 17,236.9 kPa (2500 psi). The dispersion was then spray dried at an inlet temperature of 200° C. and an outlet temperature of 100° C. Dispersions prepared in a Waring blender containing 0.5% and 1% of the powder produced were stable although there was a slight sediment recorded in each. The colloidal content of the composition was determined by the method of Example 3 to be 49.4%, indicating that the cellulose and carboxymethylcellulose combined had a colloidal content of 98.8%. This composition is identified as Example 4A. Additional compositions were prepared in the same manner, utilizing calcium carbonate having different average particles sizes. These are identified in Table 3 as Examples 4B through 4E.

TABLE 3

| | | Colloidal Content | |
|---|---|---|---|
| Example | $CaCO_3$ Particle Size (microns) | Composition (%) | Cellulose[a] (%) |
| 4A | 0.8 | 49.40 | 98.8 |
| 4B | 3.5 | 48.80 | 97.8 |
| 4C | 5.5 | 57.8 | 115.6 |
| 4D | 8.0 | 50.00 | 100.0 |
| 4E | 12–13 | 51.25 | 102.5 |

[a]Cellulose plus carboxymethylcellulose.

EXAMPLE 5

In a Hobart mixing bowl were placed 400 grams of ground limestone (particle size −8.0 microns), 974.4 grams of hydrolyzed cellulose wetcake, and 21.5 grams of high viscosity carboxymethylcellulose. The ratio of solids comprising this mixture was 47.5 parts of cellulose, 50 parts of calcium carbonate, and 2.5 parts of carboxymethylcellulose. The mixer was operated until the composition was uniform. The composition was then transferred to an twin screw extruder operated at 150 rpm with the outlet gate set initially at 1.59 mm which was increased to 6.35 mm for the first pass and 25.4 mm for the second pass. The product was dispersed in water at 8% solids and homogenized at 17,236.9 kPa (2500 psi). The dispersion was then spray dried at an inlet temperature of 200° C. and an outlet temperature of 100° C. The resulting dry powder was dispersed in water using a Waring blender producing stable dispersions at 1%, and 1.5% solids. The percent colloidal material in the composition was determined to be 41.9%, indicating a cellulose (microcrystalline cellulose plus MCC) colloidal content of 83.8%. In comparison with other compositions containing medium viscosity carboxymethylcellulose, this composition required increased shear to disperse it. This is Example 5A.

A second composition of 872 grams of hydrolyzed cellulose wetcake, 400 grams of ground limestone (particle size −8.0 microns), and 64.5 grams of low viscosity carboxymethylcellulose was prepared in exactly the same manner except that the twin screw extruder outlet gate was maintained at 25.4 mm throughout the process. The ratio of solids comprising this mixture was 42.5 parts of cellulose, 50 parts of calcium carbonate, and 7.5 parts of carboxymethylcellulose. The dry powder that was produced was completely dispersed in water at 0.5%, 1.0%, and 1.5% solids using a Lightnin' mixer for 5 minutes. Only the 1.5% dispersion was stable with a very light sediment appearing. The colloidal matter in this composition was determined to be 52.0%, indicating that the cellulose (microcrystalline cellulose plus CMC) colloidal content was 104%. This is Example 5B.

EXAMPLE 6

In a 9.46 liter (10 qt) Hobart mixing bowl were placed 1153.85 grams of hydrolyzed cellulose wetcake, 500 grams of calcium carbonate, and 53.82 grams of low methoxyl pectin. The ratio of solids comprising this mixture was 45 parts of cellulose, 50 parts of calcium carbonate, and 5 parts of low methoxyl pectin. This was mixed until a homogenous mass was attained. This mixture was run through an twin screw extruder three times. A portion (447.95 grams) of the attrited mixture was placed in a 5 liter Waring blender, and 1302.5 grams of deionized water was added. This mixture was dispersed at low speed, providing a dispersion containing 15% solids. This dispersion step was repeated one time. The dispersions were combined and homogenized at 17,236.9 kPa (2500 psi) prior to being spray dried. The spray dryer inlet was set at 210° C. and the outlet at 110° C. A total of 384 grams of dry powder was recovered after the drying step.

EXAMPLE 7

By the method of Example 1, 576.9 grams of hydrolyzed cellulose wetcake, 250 grams of tricalcium phosphate ($K_{sp}=2.07 \times 10^{-33}$), 26.9 grams of medium viscosity carboxymethylcellulose, and 45 mL of water were mixed together and passed through an twin screw extruder. A dispersion of the product in water was examined using a microscope. This indicated that both the cellulose and the tricalcium phosphate particles were of sub-micron size.

EXAMPLE 8

By the method of Example 4, 1730.8 grams of hydrolyzed cellulose wetcake, 750 grams of dicalcium phosphate ($K_{sp}=1.55 \times 10^{-7}$), and 80.64 grams of medium viscosity carboxymethylcellulose were mixed and attrited. The ratio of solids comprising this mixture was 45 parts of cellulose, 50 parts of dicalcium phosphate, and 5 parts of carboxymethylcellulose. Microscopic examination of a 2% dispersion of this material indicated that the microcrystalline cellulose was virtually 100% colloidal. An 8% dispersion of this material was spray dried under the conditions of Example 1. A 1% dispersion of the spray-dried powder in water was stable, but a 0.5% dispersion displayed some sedimentation. These results are essentially the same as those obtained with the product of Example 4. The viscosities of dispersions containing 1%, 2%, 3%, and 4% solids were approximately one-half of the corresponding dispersions of the material made in Example 4.

EXAMPLE 9

By the method of Example 4, 576.9 grams of hydrolyzed cellulose wetcake, 250 grams of calcium sulfate ($K_{sp}=4.93 \times 10^{-5}$), and 26.9 grams of medium viscosity carboxymethylcellulose were mixed and attrited. The ratio of solids comprising this mixture was 45 parts of cellulose, 50 parts of calcium sulfate, and 5 parts of carboxymethylcellulose. After attrition was completed, attempts to disperse the undried wetcake in water were unsuccessful because the microcrystalline cellulose had flocculated, presumably due to the high solubility constant for calcium sulfate.

EXAMPLE 10

In a 9.46 liter (10 qt) Hobart mixing bowl were place 1153.85 grams of hydrolyzed cellulose wetcake, 500 grams of titanium dioxide, and 53.76 grams of medium viscosity carboxymethylcellulose. The ratio of solids comprising this mixture was 45 parts of cellulose, 50 parts of titanium dioxide, and 5 parts of medium viscosity carboxymethylcellulose. This was mixed until a homogenous mass was attained. This mixture was run through a twin screw extruder three times. A portion (1144.78 grams) of the attrited mixture was placed in a colloid mill which was stirred with a Lightnin' mixer to improve sample circulation, and 7355.22 grams of deionized water was added. This mixture was milled for 10 minutes at a rheostat setting of 60, providing a dispersion containing 8% solids. Upon completion of milling, the sample was homogenized at 17,236.9 kPa (2500 psi) prior to being spray dried. The spray dryer inlet was set at 210° C. and the outlet at 110C. A total of 100 grams of dry powder was recovered after the drying step. A 0.5% solids dispersion of this powder in water was completely stable.

EXAMPLE 11

By the method of Example 4, 417.23 grams of hydrolyzed cellulose wetcake, 180.8 grams of talc, and 19.4 grams of medium viscosity carboxymethylcellulose were mixed and attrited. The ratio of solids comprising this mixture was 45 parts of cellulose, 50 parts of talc, and 5 parts of carboxymethylcellulose. After being spray dried by the method of Example 1, an aqueous 1% dispersion of the spray-dried powder in water was stable, but a 0.5% dispersion was not stable.

EXAMPLE 12

By the method of Example 4, 1153.8 grams of hydrolyzed cellulose wetcake, 515.5 grams of lactose (solubility in water=27% at 100° C.), and 53.8 grams of medium viscosity carboxymethylcellulose were mixed and attrited. The ratio of solids comprising this mixture was 45 parts of cellulose, 50 parts of lactose, and 5 parts of carboxymethylcellulose. A 7% solids dispersion was prepared and homogenized at 17,236.9 kPa (2500 psi) before being spray dried as in Example 1. When a 1% solids dispersion in water was prepared, the spray-dried powder was dispersed with great ease.

EXAMPLE 13

In a 1200 mL stainless steel beaker was placed 547.25 grams of commercial skim milk. To this milk was added with stirring 2.75 grams of the powder produced in Example 1. After mixing was complete, the mixture was heated to 79.4° C. (175° F) in a water bath. The mixture was then homogenized in two stages; the first stage at 17,236.9 kPa (2500 psi) and the second stage at 3,447.4 kPa (500 psi). Following homogenization, the milk was cooled to 4° C. (40° F.) in a cooling bath. Upon completion of cooling, this milk was observed to determine the extent to which a precipitate had appeared, then was observed one week later to determine the extent a precipitate formed on storage. The results of Examples 13A through 13G are shown in Table 4.

TABLE 4

| Example | MCC/CaCO$_3$ Source | Initial Observations | Seven Day Observations |
| --- | --- | --- | --- |
| 13A | Ex 1 | Stable, no precipitate | Significant precipitate |
| 13B | Ex 4B | Stable, no precipitate | Slight precipitate |
| 13C | Ex 4C | Stable, no precipitate[a] | Slight precipitate |
| 13D | Ex 4D | Stable, no precipitate | Very slight precipitate |
| 13E | Ex 4E | Stable, no precipitate | Very slight precipitate |
| 13F | Ex 6A | Significant precipitate | Very significant precipitate |
| 13G | Ex 6B | Very fine precipitate | Very slight precipitate |

[a]A very slight dryness was perceived on the tongue when this fortified skim milk was tasted.

All of the above formulations were judged acceptable with the possible exception of 13F, which was marginally acceptable, and resulted in a calcium fortified milk that contained 40% more calcium that the starting skim milk.

A fortified low fat milk was prepared using a similar procedure by adding 0.25 weight percent of the composition of Example 4A and 0.016 weight percent of Seakem® CM 611 carrageenan to low fat milk containing 96.46 weight percent skim milk and 3.28 weight percent heavy cream (38%) fat. Except for the heavy cream, all weight percents are based on the total weight of the fortified low fat milk. This low fat milk provides an additional 120 milligrams of calcium per 240 mL serving.

EXAMPLE 14

To 375.96 grams of water in a large stainless steel beaker was added 2.25 grams of hydrolyzed cellulose wetcake (45 parts), calcium carbonate (50 parts), and medium viscosity carboxymethylcellulose (5 parts) prepared in Example 1. The microcrystalline cellulose was dispersed for 10 minutes using a Lightnin' mixer. Upon completion of dispersion, a dry blend of 0.515 grams of vitamins and minerals (premix) ®, 3.55 grams of soy protein isolate, and 0.075 gram of carrageenan (Viscarin® GP 209) were added to the dispersion which was then mixed for 30 minutes. Finally, 12.5 grams of corn oil, 43 grams of corn syrup solids (24DE), 33 grams of granular sucrose, 16.5 grams skim milk powder, 3 grams each of red dutched cocoa and natural cocoa, 1.5 grams of potassium citrate, 1.4 grams of soy lecithin, 1.25 grams vanilla flavor, 1.15 grams of potassium chloride, 1 gram of dipotassium phosphate, and 0.35 gram of sodium chloride were added to the mixture which was then stirred for 5 minutes. The mixture was then pasteurized in a high temperature short time pasteurization apparatus at 79.4° C. (175° F.) for three seconds. Following pasteurization, the mixture was homogenized in two stages, 20,684 kPa (3000 psi) and 3,447.4 kPa (500 psi). After being cooled, the mixture was bottled and allow to sit quiescently for at least 16 hours before being visually examined. The viscosity was measured at 5° C. (41° F.) using a Brookfield LVF viscometer equipped with Spindle #1 operated at 60 rpm. After sitting undisturbed for more than 72 hours, the sample was shaken and observed and a second viscosity measurement taken. The formulae for three products, designated Examples 14A, 14B and 14C are shown in Table 5.

TABLE 5

| Ingredients | 14A (%) | 14B (%) | 14C (%) |
|---|---|---|---|
| Water | 75.192 | 74.792 | 75.092 |
| Corn syrup solids, 24DE | 8.600 | 8.600 | 8.600 |
| Sucrose, granular | 6.600 | 6.600 | 6.600 |
| Skim milk powder | 3.300 | 3.300 | 3.300 |
| Corn oil | 2.500 | 2.500 | 2.500 |
| Soy protein isolate | 0.710 | 0.710 | 0.710 |
| MCC/CaCO$_3$/CMC[a] | 0.450 | 0.850 | — |
| Microcrystalline cellulose[b] | — | — | 0.450 |
| Cocoa, red dutched | 0.600 | 0.600 | 0.600 |
| Cocoa, natural | 0.600 | 0.600 | 0.600 |
| Potassium citrate | 0.300 | 0.300 | 0.300 |
| Soy lecithin | 0.280 | 0.280 | 0.280 |
| Vanilla flavor | 0.250 | 0.250 | 0.250 |
| Potassium chloride | 0.230 | 0.230 | 0.230 |
| Dipotassium phosphate | 0.200 | 0.200 | 0.200 |
| Vitamin/mineral premix | 0.103 | 0.103 | 0.103 |
| Sodium chloride | 0.070 | 0.070 | 0.070 |
| Carrageenan[c] | 0.015 | 0.015 | 0.015 |
| Calcium carbonate | — | — | 0.100 |

[a]Product of Example 1
[b]Avicel® CL-611, FMC Corporation, Philadelphia, PA 19103
[c]Viscarin® GP 209, FMC Corporation, Philadelphia, PA 19103

Table 6 shows the properties of Examples 14A, 14B, and 14C.

TABLE 6

| Example 14A | Visual Rating | Viscosity (cps) |
|---|---|---|
| 16 hours | Marbling and fine calcium carbonate precipitate | 41.5 |
| 72 hours | Coarse particles, some fine calcium carbonate precipitate, no marbling or mottling | 47 |
| 14B | | |
| 16 hours | Slightly chalky mouth feel, marbling, and calcium carbonate precipitate | 113[a] |
| 72 hours | No settling, marbling, or mottling | 97.5[a] |
| 14C | | |
| 16 hours | Heavy settling of cocoa, calcium carbonate, and/or vitamins and minerals | 38.5 |
| 72 hours | Settling of calcium carbonate and some coarse cocoa particles | 48 |

[a]Measured with Spindle #2 operated at 60 rpm

Example 14A produced a very acceptable product with an desirable viscosity and minimal precipitate which could readily be redispersed upon shaking. Example 14B was too viscous due to the higher level of MCC employed. Example 14C was far less satisfactory, exhibiting heavy settling at both 16 and 72 hours. This example demonstrates the composition may be effectively utilized in nutritional beverages. It also illustrates the improvement over dispersions made with Avicel® CL-611 cellulose.

EXAMPLE 15

In a container stirred with a Lightnin' mixer were placed 2692.4 grams of skim milk and 400 grams of heavy cream. This mixture was mixed for about 5 minutes before adding a dry blend of 266.8 grams of skim milk powder, 400 grams of sugar, 210 grams of corn syrup solids (42DE), 16 grams of attrited hydrolyzed cellulose wetcake/calcium carbonate/carboxymethylcellulose powder (Example 1), 0.8 grams of carrageenan (Lactarin® IC 1222 sold by FMC Corporation), 4 grams of carboxymethylcellulose (Aqualon® 7HF, sold by Hercules Incorporated), and 10 grams of emulsifier (Tandem 100K, an 80:20 mixture of mono,diglycerides:Polysorbate 80, sold by Witco Corporation) was added to the vortex of the mixer and mixed for 30 minutes to fully hydrate the gums. Upon completion of mixing, the mixture was pasteurized by a high temperature short time process utilizing a Cherry-Burrel Ultra High Temperature unit operated for two minutes at 76.7° C. (170° F.). After pasteurization, the mixture was homogenized using an APV Gaulin Homogenizer, the first stage being operated at 13,789.5 kPa (2000 psi) and the second stage at 3,447.4 kPa (500 psi.) Upon completion of homogenization, the mixture was cooled and aged overnight in a refrigerator at 1.7–4.4° C. (35–40° F.). There was no separation of the mixture. The next day 37.9 grams of vanilla flavor were added with gentle stirring by a wooden spoon to prevent incorporation of air into the mixture prior to freezing it in a Taylor continuous freezer. Also, prior to being frozen, the viscosity of 400 mL of the mixture was determined to be 310 cps using a Brookfield LVF viscometer. A second viscosity measurement, 43 seconds, was made using a #2 Zahn cup. The over-run of the frozen dessert was 65%, and the standard melting performance resulted in a melt of 68 mL. A taste test revealed that the ice cream provided equivalent performance to Avicel® RC-581, currently being used commercially as a stabilizer in low fat ice cream, but with added calcium values.

EXAMPLE 16

The amounts of colloidal matter in the compositions of this invention were shown to correlate to the total amount of cellulose and carboxymethylcellulose present by the gravimetric method of Example 3. The size of the cellulose particles present in the composition was determined by laser light scattering methods using a Horiba LA-910 particle size distribution analyzer. The size distribution of the pure calcium carbonate was analyzed, providing a normal size distribution. Analyzing the hydrolyzed cellulose wetcake/calcium carbonate/carboxymethylcellulose yielded a distribution almost identical with that of the calcium carbonate alone, indicating that the relatively large particles of the calcium carbonate dominate the analysis and almost totally hide smaller particles. To overcome this effect, the dispersion of powder prepared in Example 1 was centrifuged at 8000 rpm for 15 minutes. The supernatant was removed and analyzed by light scattering. The results of this analysis showed that 100% of the particles had sizes less than 0.7 μm and that approximately 90% were below 0.3 μm. The range was 0.1 μm to 0.7 μm, with the average size being slightly below 0.2 μm. Two commercial products were analyzed by the gravimetric and the method of light scattering combined with centrifugation in exactly the same way. A comparison of the results of these three analyses are shown in Table 7.

TABLE 7

| Sample | Example | RC-581[a] | CL-611[b] |
|---|---|---|---|
| Gravimetric % colloidal[c] | 98.8 | 61.2[d] | 67.4[d] |
| Particle size distribution | | | |
| Total sample | NA[e] | 0.5–275 μm | 0.4–50 μm |
| Mean particle size | NA | 17.03 μm | 8.29 μm |
| Centrifuged sample | 0.1–0.7 μm | 0.2–0.9 μm | 0.1–0.7 μm |
| Mean particle size | <0.2 μm | 0.31 μm | ~0.25 μm |

[a]Avicel® RC-581, FMC Corporation, Philadelphia, PA 19103
[b]Avicel® CL-611, FMC Corporation, Philadelphia, PA 19103
[c]Percent colloidal material as determined by the method of Example 3
[d]Based on the total sample of cellulose plus carboxymethylcellulose
[e]Not applicable because of the presence of 50% calcium carbonate Avicel® CL-611 cellulose is one of the most colloidal microcrystalline cellulose materials currently available commercially, yet only about 67–68% of this material is in the size range where nearly 100% material of the invention is found. Further, the mean particle size of the Avicel® CL-611 cellulose is significantly larger than that of the invention. Avicel® RC-581 cellulose has even larger mean particle size and has less colloidal content than does Avicel® CL-611 cellulose.

EXAMPLE 17

A small beaker containing 30 grams of propylene glycol was heated to 50° C. and stirred with a Lightnin' mixer to dissolve 1 gram of methyl paraben and 0.1 gram of propyl paraben. When mixing was complete, this solution was added to 400 grams of deionized water in a 2 liter mixing bowl. After complete mixing, 200 grams of a 70% sorbitol solution (USP) and 1.6 grams of sodium saccharin (USP) were added to the aqueous solution and mixed until complete dissolution was achieved. Next, 100 grams of coprocessed microcrystalline cellulose/calcium carbonate/carboxymethylcellulose powder prepared as described in Example 4 was added and dispersed using a Scott Turbon Mixer operated at 2000 rpm for a ten minute period. Sufficient deionized water was added to bring the total volume of this dispersion up to 1 liter, and the suspension was mixed until it was uniform. This elegant suspension was pourable and had a viscosity of 120 cps as measured by a Carrimed Rheometer operated at 6 rpm. The suspension initially appeared to be stable and remained stable after storage periods of three months at 4° C., 25° C., 30° C., and 40° C. A 10 mL portion of this antacid suspension was capable of neutralizing 11.5 milliequivalents of acid.

EXAMPLE 18

A small beaker containing 15 grams of propylene glycol was heated to 50° C. and stirred with a Lightnin' mixer to dissolve 0.5 gram of methyl paraben and 0.05 gram of propyl paraben. When mixing was complete, this solution was added to 200 grams of deionized water in a 1 liter mixing bowl. After complete mixing, 100 grams of a 70% sorbitol solution (USP) and 0.8 gram of sodium saccharin (USP) were added to the aqueous solution and mixed until complete dissolution was achieved. Next, 75 grams of coprocessed microcrystalline cellulose/calcium carbonate/carboxymethylcellulose powder prepared as described in Example 4 was added and dispersed using a Lightnin' mixer for a ten minute period. Sufficient deionized water was added to bring the total volume of this dispersion up to 0.5 liter, and the suspension was mixed until it was uniform and had the appearance of whipped cream. To 5 mL of this whipped suspension was added 160 milligrams of acetaminophen. The ingredients were well mixed, producing a spoonable whipped creamy suspension of acetaminophen.

We claim:

1. An ultra-fine attrited microcrystalline cellulose composition comprising microcrystalline cellulose particles 80% to 100% of which have a particle size not greater than 1 $\mu$m, an attriting aid which is an ionic material having an aqueous $K_{sp}$ equal to or less than $1 \times 10^{-7}$ or a powdered or granular material having a solubility in water equal to or less than 40% at 100° C., and optionally a protective colloid.

2. The composition of claim 1, in which the weight ratio of the microcrystalline cellulose to attriting aid is in the range of 85:15 to 30:70 and the weight ratio of microcrystalline cellulose to protective colloid when present is in the range is 95:5 to 70:30.

3. The composition of claim 1 in which the attriting aid is selected from the group consisting of calcium carbonate, titanium dioxide, tricalcium phosphate, silica, dicalcium phosphate, talc, and lactose.

4. The composition of claim 1 in which there is employed a protective colloid.

5. The composition of claim 1 in which at least 90% of the microcrystalline cellulose has a particle size of not more than 0.75 $\mu$m.

6. The composition of claim 1 in which the mean particle size of the microcrystalline cellulose is in the range of 0.1 $\mu$m to 0.7 $\mu$m.

7. The composition of claim 1 which is the dried residue of a suspension of microcrystalline cellulose, an attriting aid selected from the group consisting of calcium carbonate, titanium dioxide, tricalcium phosphate, dicalcium phosphate, talc, and lactose and a protective colloid selected from the group consisting of carboxymethylcellulose and pectin.

8. The composition of claim 7 in which the particle size of said microcrystalline cellulose particles is produced by high solids wet grinding of microcrystalline cellulose wetcake in the presence of said attriting aid.

9. The composition of claim 1 in which the particle size of said microcrystalline cellulose particles is produced by high solids wet grinding of microcrystalline cellulose wetcake in the presence of said attriting aid.

10. The ultra-fine attrited microcrystalline cellulose composition of claim 1 comprising microcrystalline cellulose particles which when dispersed have an particle size distribution such that at least 95% of the microcrystalline cellulose has a particle size of not more than 0.7 $\mu$m, and is colloidally stable.

11. A pourable aqueous suspension comprising the composition of claim 1 in admixture with one or more additional ingredients selected from the group consisting of an alkyl glycol, an alkyl paraben, sorbitol, saccharin, and a mixture thereof.

12. A calcium fortified food product which comprises a dispersion of a nutrient suspended in a stabilizing amount of the composition of claim 1.

13. The product of claim 12 which includes a therapeutic or supplementary amount of vitamins, minerals or both.

14. A calcium fortified dairy product in which the dairy product is stabilized with the composition of claim 1.

15. The composition of claim 14 in which the dairy product is reduced fat milk.

16. A food product comprising a-frozen dessert which is stabilized with the composition of claim 1.

17. A liquid composition comprising the composition of claim 1 in admixture water and a biologically effective amount of a substantially water insoluble pharmaceutical agent.

18. A spoonable whipped suspension having the appearance, texture and consistency of whipped cream comprising the composition of claim 1 in admixture with one or more additional ingredients selected from the group consisting of an alkyl glycol, an alkyl paraben, sorbitol, saccharin, and a mixture thereof.

19. A process for preparing an ultra-fine microcrystalline cellulose composition comprising:

(a) blending together unattrited microcrystalline cellulose, an attriting agent which is an ionic material having an aqueous $K_{sp}$ equal to or less than $1 \times 10^{-7}$ or a powdered or granular material having a solubility in water equal to or less than 40% at 100° C. and optionally a protective colloid, in which the solids content represented by the microcrystalline cellulose and attriting agent is in the range of 30% to 80% by weight of the blend, the weight ratio of microcrystalline cellulose to attriting agent is in the range of 85:15 to 30:70, and the weight ratio of microcrystalline cellulose to protective colloid, when used, is in the range of 95:5 to 70:30;

(b) subjecting the blend to high shear wet grinding for a time and under shear forces sufficient to reduce the microcrystalline cellulose to a particle size in which 80% to 100% of the microcrystalline cellulose present has a particle size not greater than 1 μm; and (c) recovering the resulting ultra fine microcrystalline cellulose composition.

20. The process of claim 19 in which the attriting agent is selected from the group consisting of calcium carbonate, titanium dioxide, tricalcium phosphate, dicalcium phosphate, silica, talc, and lactose.

21. The process of claim 20 in which there is employed a protective colloid.

* * * * *